US011928027B1

(12) United States Patent
Trikamlal et al.

(10) Patent No.: US 11,928,027 B1
(45) Date of Patent: Mar. 12, 2024

(54) SYSTEM AND METHOD FOR ERROR CHECKING AND CORRECTION WITH METADATA STORAGE IN A MEMORY CONTROLLER

(71) Applicant: Cadence Design Systems, Inc., San Jose, CA (US)

(72) Inventors: Modi Dipakkumar Trikamlal, Ahmedabad (IN); Maddula Balakrishna Chaitanya, Andhra Pradesh (IN)

(73) Assignee: Cadence Design Systems, Inc., San Jose, CA (US)

(*) Notice: Subject to any disclaimer, the term of this patent is extended or adjusted under 35 U.S.C. 154(b) by 23 days.

(21) Appl. No.: 17/952,453

(22) Filed: Sep. 26, 2022

(51) Int. Cl.
*G06F 11/10* (2006.01)

(52) U.S. Cl.
CPC ........ *G06F 11/108* (2013.01); *G06F 11/1092* (2013.01)

(58) Field of Classification Search
None
See application file for complete search history.

(56) References Cited

U.S. PATENT DOCUMENTS

| | | | | |
|---|---|---|---|---|
| 9,191,082 B2* | 11/2015 | Choi | ...................... | H04H 20/44 |
| 9,647,800 B2* | 5/2017 | Lucani | .................. | H04L 1/0065 |
| 10,924,314 B2* | 2/2021 | Baek | ...................... | H04L 1/0041 |
| 11,075,786 B1* | 7/2021 | Shattil | .................. | H04L 5/0007 |
| 2004/0003336 A1* | 1/2004 | Cypher | .................. | G11C 29/42 |
| | | | | 714/763 |
| 2010/0293436 A1* | 11/2010 | Coteus | .................. | H03M 13/35 |
| | | | | 714/763 |
| 2010/0299575 A1* | 11/2010 | Roth | ..................... | G11C 7/1006 |
| | | | | 714/755 |
| 2011/0299629 A1* | 12/2011 | Luby | ...................... | H04L 1/0065 |
| | | | | 375/299 |
| 2012/0314762 A1* | 12/2012 | Herrmann | ............. | H04L 1/0025 |
| | | | | 375/E7.126 |
| 2013/0329811 A1* | 12/2013 | Breiling | ................. | H04N 19/85 |
| | | | | 375/240.26 |
| 2022/0224361 A1* | 7/2022 | Alic | .................. | H03M 13/2957 |

OTHER PUBLICATIONS

Manzhosov et al., "MUSE: Multi-Use Error Correcting Codes", Jul. 20, 2021, Columbia University, arXiv:2107.09245v1 (Year: 2021).*

* cited by examiner

*Primary Examiner* — Daniel F. McMahon
(74) *Attorney, Agent, or Firm* — Mark H. Whittenberger, Esq.; Holland & Knight LLP

(57) ABSTRACT

Embodiments include receiving fixed size error checking and correction data blocks and metadata at a memory controller. Embodiments may include performing data to symbol mapping based upon the fixed size data blocks and providing an output of the data to symbol mapping to a first encoder without metadata configured for full detection correction of single device error and to a second encoder with metadata configured for partial detection correction of single device error. Embodiments may include receiving data at a memory based upon an output from the first encoder and the second encoder and receiving data from the memory at a first decoder without metadata configured for full detection correction of single device error and at a second decoder with metadata configured for partial detection correction. Embodiments may include re-mapping symbol data from the first decoder and the second decoder to actual data and generating output data blocks and metadata.

20 Claims, 12 Drawing Sheets

FIG. 10

SYSTEM AND METHOD FOR ERROR CHECKING AND CORRECTION WITH METADATA STORAGE IN A MEMORY CONTROLLER

BACKGROUND

A memory controller is a digital circuit that manages the flow of data going to and from the computer's main memory. It may be a separate chip or integrated into another chip, such as being placed on the same die or as an integral part of a microprocessor. Device correct error checking and correcting (ECC) is a form of advanced error checking and correcting computer memory technology that protects computer memory systems from any single memory chip failure as well as multi-bit errors from any portion of a single memory chip. This allows memory contents to be reconstructed despite the complete failure of one chip. Partial or full device failures are result in burst of errors and impacts one or more data lines of the device.

SUMMARY

In one or more embodiments of the present disclosure, a method is provided. The method may include receiving fixed size error checking and correction data blocks and metadata at a memory controller. The method may include performing data to symbol mapping based upon the fixed size data blocks and providing an output of the data to symbol mapping to a first encoder without metadata configured for full detection correction of single device error and to a second encoder with metadata configured for partial detection correction of single device error. The method may include receiving data at a memory based upon an output from the first encoder and the second encoder and receiving data from the memory at a first decoder without metadata configured for full detection correction of single device error and at a second decoder with metadata configured for partial detection correction. The method may include re-mapping symbol data from the first decoder and the second decoder to actual data and generating output data blocks and metadata.

One or more of the following features may be included. In some embodiments, at least one of the first decoder and the second decoder may be an erasure decoder. The output of the data to symbol mapping may be first provided to a parity generator. Receiving data from the memory may be first provided to a parity checker. The memory controller may be a DDR memory controller. The first encoder and second encoder may be Reed-Solomon error checking and correcting (RSECC) encoders. The output of the data to symbol mapping may be provided to a data block that provides toggle control for consecutive data blocks.

In another embodiment of the present disclosure, a computer-implemented method is provided. The method may include receiving a plurality of fixed size error checking and correction data blocks and metadata at a double data rate (DDR) memory controller. The method may further include performing data to symbol mapping based upon, at least in part, the plurality of fixed size data blocks and providing an output of the data to symbol mapping to a first RSECC encoder without metadata configured for full detection correction of single device error and to a second RSECC encoder with metadata configured for partial detection correction of single device error. The method may further include receiving data at a memory based upon, at least in part, an output from the first RSECC encoder and the second RSECC encoder. The method may also include receiving data from the memory at a first RSECC decoder without metadata configured for full detection correction of single device error and at a second RSECC decoder with metadata configured for partial detection correction. The method may further include re-mapping symbol data from the first RSECC decoder and the second RSECC decoder to actual data and generating a plurality of output data blocks and metadata.

One or more of the following features may be included. In some embodiments, at least one of the first RSECC decoder and the second RSECC decoder may be an erasure decoder. The output of the data to symbol mapping may be first provided to a parity generator. Receiving data from the memory may be first provided to a parity checker. The output of the data to symbol mapping may be provided to a data block that provides toggle control for consecutive data blocks. The parity generator may be configured to generate parity calculations across all connected devices for one or more selected bits. Receiving data at the memory may include receiving metadata at the memory.

In yet another embodiment of the present disclosure a system is provided. The system may include a memory controller configured to receive one or more fixed size error checking and correction data blocks and metadata. The memory controller may include a data to symbol mapping portion further configured to perform data to symbol mapping based upon, at least in part, the one or more fixed size data blocks. The data to symbol mapping portion may be further configured to provide an output of the data to symbol mapping to a first encoder without metadata configured for full detection correction of single device error and to a second encoder with metadata configured for partial detection correction of single device error. The system may include a memory configured to receive data based upon, at least in part, an output from the first encoder and the second encoder. The system may also include a first decoder without metadata configured to receive data from the memory, wherein the first decoder without metadata is configured for full detection correction of single device error. The system may further include a second decoder with metadata configured to receive data from the memory, wherein the second decoder is configured for partial detection correction. The system may also include a symbol re-mapping portion configured to re-map symbol data from the first decoder and the second decoder to actual data and to generate one or more output data blocks and metadata.

One or more of the following features may be included. In some embodiments, at least one of the first decoder and the second decoder may be an erasure decoder. The output of the data to symbol mapping may be first provided to a parity generator. Receiving data from the memory may be first provided to a parity checker. The memory controller may be a DDR memory controller. The output of the data to symbol mapping may be provided to a data block that provides toggle control for consecutive data blocks.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 5 illustrates a table showing symbol mapping per data block across beats consistent with embodiments of the present disclosure;

FIG. 7 illustrates a table showing a burst error/device failure example consistent with embodiments of the present disclosure;

FIGS. 8-9 illustrates a table showing 1-bit soft error/random fault examples consistent with embodiments of the present disclosure;

FIG. 10 illustrates a table showing error detection in data block #2 with parity consistent with embodiments of the present disclosure;

DETAILED DESCRIPTION

Figure 1:
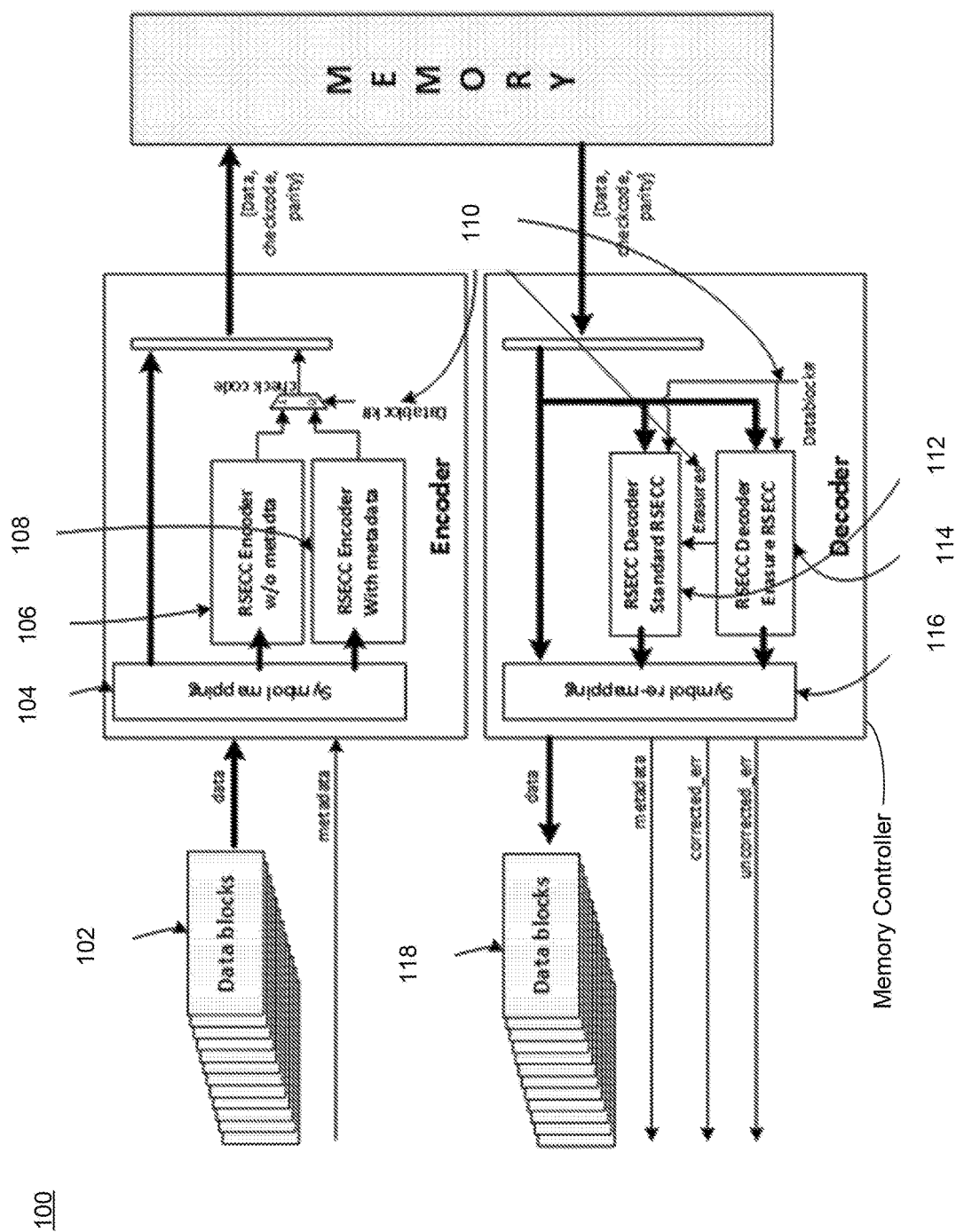
FIG. 1 illustrates a single device error detection and correction with metadata system consistent with embodiments of the present disclosure.

Referring now to FIGS. 1-12, embodiments of the present disclosure are directed towards a mechanism for device correct error checking and correction. Typical implementations use advanced codes, such as a Reed Solomon (RS) based ECC code. Two types of RS codecs may be used: standard (e.g., error location not known) RSECC and Erasure (e.g., error location known) RSECC.

In some embodiments, a standard or erasure RS codec may be presented as RS (n, k, m, t) where
   m=Number of bits in a symbol
   k=Message block data size in number of symbols
   n=Total size=data symbols+check symbols, where $n<2^m$
   t=Correctible number of symbols, where $t=(n-k)/2$ for Standard RSECC and $t=(n-k)$ for Erasure RSECC.

The ECC code storage is overhead, and this overhead depends on the correction capability required for a targeted use case. Storage devices are available with additional space for ECC codes storage that aid in supporting error correction by memory controllers, which is generally referred to as side band/out of band ECC.

Often, there is a need to store additional information, such as metadata, along with actual data. This, in turn, may require additional storage in memory, thus in order to store metadata it may be necessary to use the space designated for ECC storage, which may result in less space for ECC codes and therefore reduced correction capability. Embodiments included herein may be used to create a space for metadata storage without compromising any device correct capability of the memory controller.

Usually when additional storage, for ECC codes or metadata, is not available in memory, the controller may implement an in-line access mechanism that allocates a portion of the memory as additional storage. In this example, the memory that was originally designated for actual data storage is utilized. Accordingly, there is space to store ECC codes and metadata by allocating the required space from the main storage space.

Memory components that have separate ECC storage available on memory, as side band ECC, cannot accommodate metadata as all the additional space is used for ECC code storage. In such a case no solution exists for ECC and metadata storage.

In-line ECC may be used when a memory component does not provide additional storage for ECC. The mechanism can be applied for metadata storage and access. However, the implementation of inline-ECC is very complex and has a very high latency overhead that ultimately impacts performance. There is also a reduced space in the memory for actual data storage.

Accordingly, embodiments of the present disclosure may target side band ECC applications that do not require additional storage for metadata. As such, there is no compromise on error correction capability as a single device correction with metadata solution is presented.

Various embodiments of the methods and systems will now be described in detail with reference to the drawings, which are provided as illustrative examples of the invention so as to enable those skilled in the art to practice the invention. Notably, the figures and the examples below are not meant to limit the scope of various embodiments, unless otherwise specifically described in particular embodiment(s) or recited in the claim(s). Where certain elements of embodiments may be partially or fully implemented using known components (or methods or processes), portions of such known components (or methods or processes) that are necessary for an understanding of the present invention will be described, and the detailed descriptions of other portions of such known components (or methods or processes) will be omitted for ease of explanation and to not obscure embodiments of the invention. Further, embodiments encompass present and future known equivalents to the components referred to herein by way of illustration. More details about various processes or modules to implement various embodiments are further described below with reference to FIGS. 1-11.

Referring again to FIG. 1, an exemplary system 100 for device correct ECC is provided. In some embodiments, system 100 may provide for metadata storage in a memory controller (e.g. DDRx) using a combination of standard RSECC, erasure RSECC, and parity codecs. Accordingly, embodiments included herein may be used in accordance with DDRx memory controllers where additional metadata may be required to be stored along with data and ECC-codes storage. It should be noted that although examples included herein may focus upon DDRx examples, various other applications may also be used if the solution fits the need for ECC. While some embodiments show a DDRx memory rank with 18×4 and 10×4 devices various other configurations may also be used without departing from the scope of the present disclosure. Embodiments included herein may provide single device error detection and correction capability with 8 bits of metadata storage for each 256 bits of actual data.

Referring again to FIG. 1, system 100 may include a memory controller configured to communicate with a memory device. In the examples provided below, at any given time, there is only one device failure per data-block. The device correction is for a device showing burst errors that spread across multiple data-blocks of the same device. In operation, input data may be split into fixed size ECC data-blocks 102. In some embodiments, input data may be split into consecutive data blocks of a fixed size. The data-block size may depend on the RSECC codec used. The memory controller may include a data to symbol mapping component 104 that may receive data blocks 102 and perform data to symbol mapping for RSECC encoders 106, 108. Data to symbol mapping component 104 may include logic that may map the incoming data in a way that all 8 bits in a symbol may be stored in a single device only. The single device may have one or more symbols mapped to it depending on the RSECC codec used. RSECC encoder 106 may be capable of full detection-correction of single device error and RSECC encoder 108 may be capable of partial detection-correction of single device error. RSECC encoder 106 may be without metadata and may be configured to encode the data blocks that do not include metadata and may have double the parity symbols than the number of symbols to be corrected. This RSECC must be capable of correcting all the symbols mapped to one device, hence full device correction. This data block is referred to herein as data-block #1. RSECC encoder 108 may include metadata and may be configured to encode the data blocks and metadata and has double the parity symbols than the number of symbols to be corrected. This RSECC must be capable of correcting half the symbols mapped to any single device, hence partial device correction. This is because half the ECC code storage space may be occupied by the metadata. This data block is referred to herein as data-block #2.

In some embodiments, RSECC encoders 106 and 108 may provide an output to data block identification 110 and erasure for the next data block RSECC. Data block identification may provide a toggle control for consecutive data-blocks (e.g., two data-block groups) for ECC processing. Each DDRx access operation is a memory burst operation where one memory burst always has even number of total data blocks. For the first data block in a memory burst the toggle control value may be '0' and the associated data-block may be referred to as data-block #1 and the next data-block as data-block #2. The erasure is the error position detected in the standard RSECC decoder that processes data-block #1. This error location information helps the erasure based RSECC decoder for full device correction. RSECC decoder 112 may be capable of full detection-correction of single device error and RSECC erasure decoder 114 may be capable of full correction of single device error with erasures. RSECC decoder 112 may be without metadata and may be configured to correct all of the symbols associated with any single device and provide full device correction for data-block #1. RSECC decoder 112 has information about the position of erroneous device and associated symbols. This information acts as erasures for the next data-block processing in other RSECC decoder. Erasures are only valid if it is burst error case (multi-bit error) for single device. Decoders 112 and 114 may receive data, checkcode, parity information from the memory. RSECC symbol data re-mapping component 116 may perform symbol data re-mapping to actual data. Symbol re-mapping component 116 may be configured to convert symbol grouped data to original user data—reverse mapping of data blocks 102. ECC data-blocks 118 may then map to output data. Output data aggregated that is compatible to the read-data receiving logic outside this RSECC logic. RSECC erasure decoder 114 may include metadata and may be configured to correct all of the symbols associated with any single device and to provide full device correction for data-block #2 using erasures information from the decoder that processed the previous data-block #1. It is safe to assume that burst errors in the case of device failure may spread across both the data-blocks. In the case of non-availability of erasures, partial device correction may be possible with the parity symbols obtained and this may be a random soft error and not a burst error causing a device failure.

Figure 2:
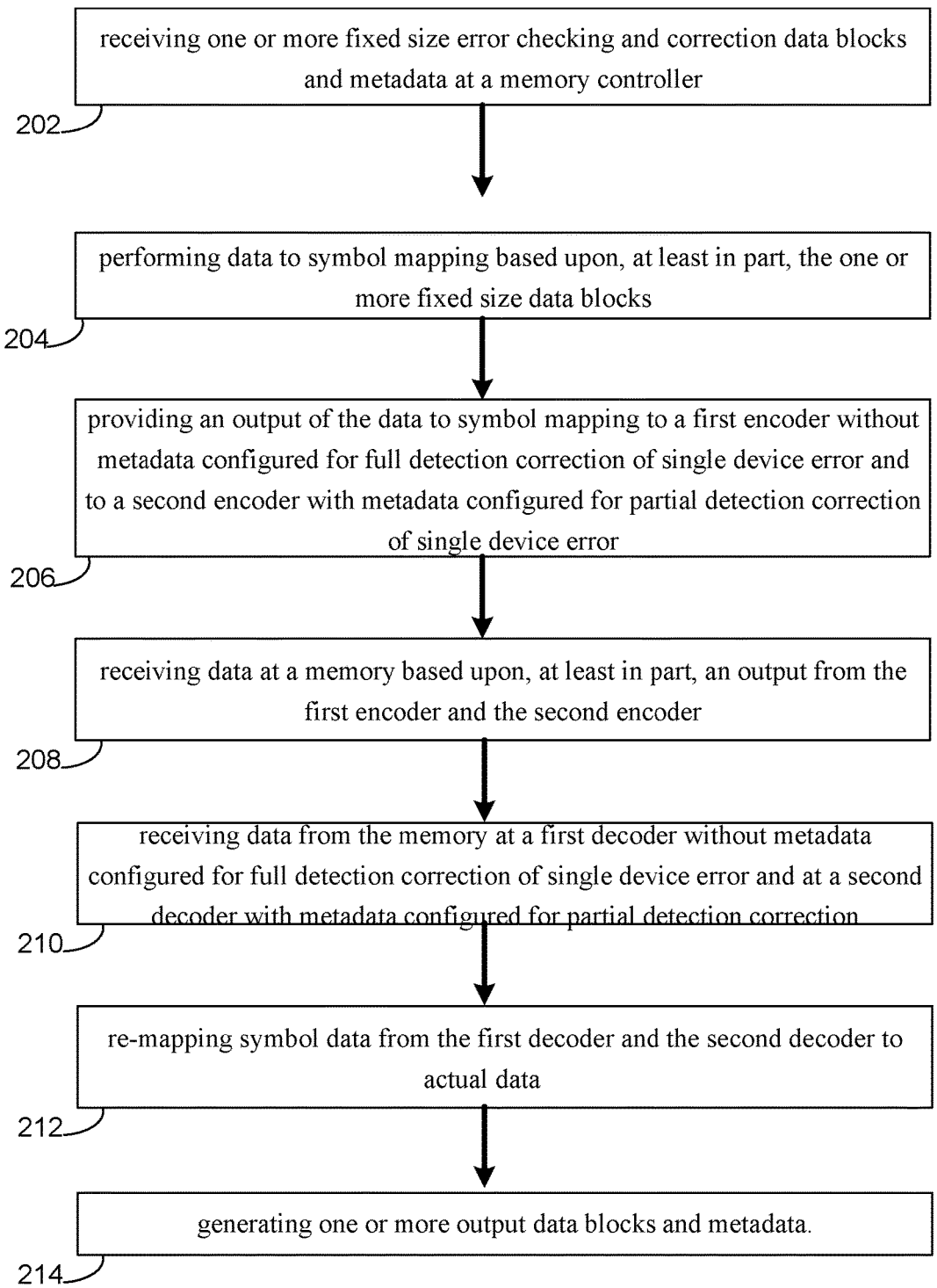
FIG. 2 illustrates a flowchart depicting operations consistent with embodiments of the present disclosure.

Referring now to FIG. 2, a flowchart depicting an embodiment for propagating poison information is provided. The method may include receiving (202) fixed size error checking and correction data blocks and metadata at a memory controller. The method may include performing (204) data to symbol mapping based upon the fixed size data blocks and providing (206) an output of the data to symbol mapping to a first encoder without metadata configured for full detection correction of single device error and to a second encoder with metadata configured for partial detection correction of single device error. The method may include receiving (208) data at a memory based upon an output from the first encoder and the second encoder and receiving (210) data from the memory at a first decoder without metadata configured for full detection correction of single device error and at a second decoder with metadata configured for partial detection correction. The method may include re-mapping (212) symbol data from the first decoder and the second decoder to actual data and generating (214) output data blocks and metadata. Numerous other operations are also within the scope of the present disclosure as are discussed in further detail hereinbelow.

Figure 3:
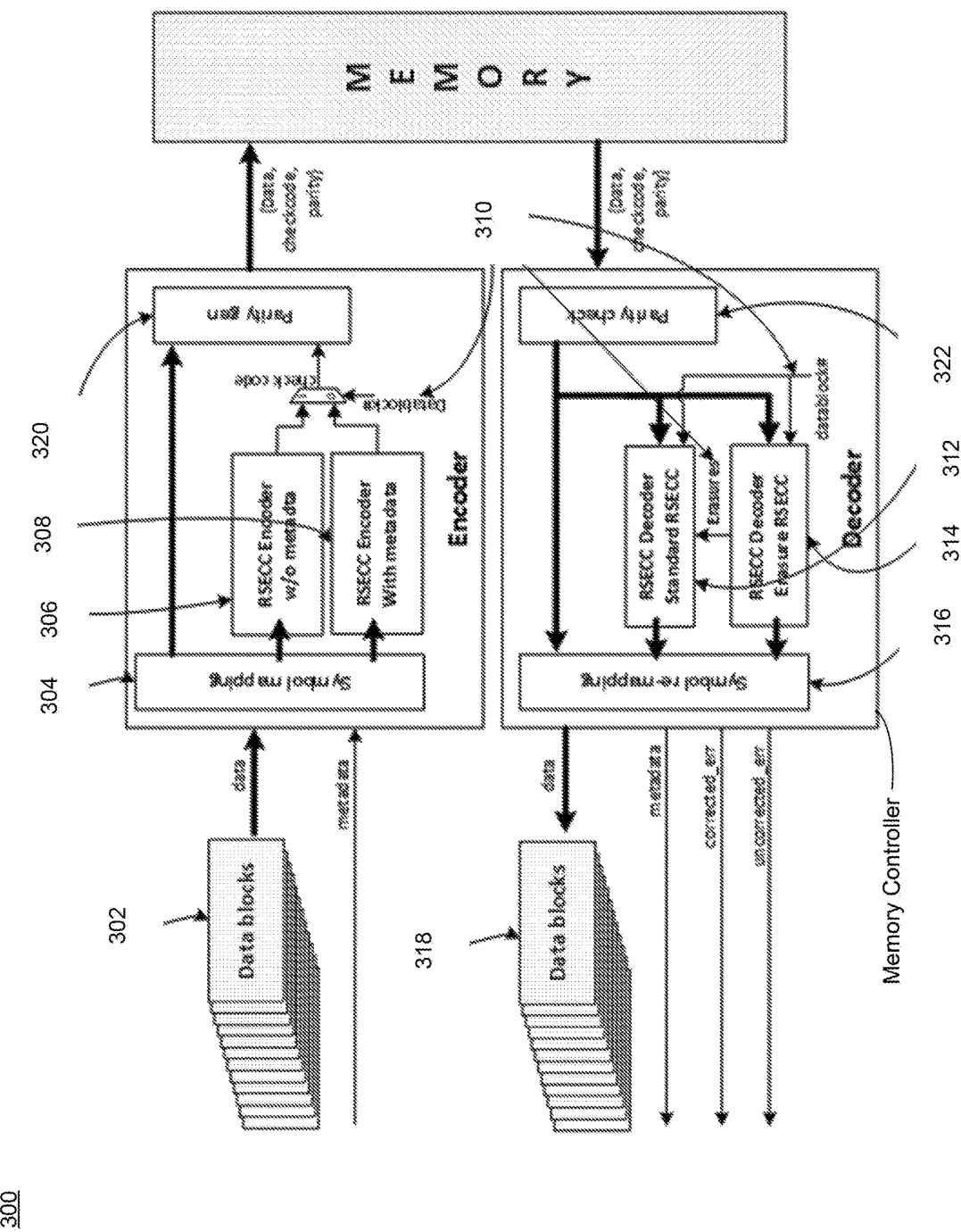
FIG. 3 illustrates another single device error detection and correction with metadata system consistent with embodiments of the present disclosure.

Referring now to FIG. 3, system 300 may include a memory controller configured to communicate with a memory device similar to that provided in FIG. 1. In this particular example a parity generator 120 and a parity checker 122 are also provided. Parity generator 120 may be configured to provide parity calculations across all of the connected devices for selected bits. Parity generator 120 may include multiple parity generation blocks where each block generates a 1 bit parity value using 1 bit from each device in the memory. As there is only 1 bit used from each device in a parity generation block, it is possible to detect any bit flip due to device error. With multiple parity generation blocks multiple bits may be covered from the same device and increase the robustness of the device error detection logic. Parity checker 122 may be configured to detect the presence of single device error. As such, parity checker 122 may indicate if there is a single device error when calculated parity has an unexpected value.

As shown above, embodiments included herein may support metadata storage along with ECC codes and provides single device correction for memory controllers that targets memory components having sideband ECC storage. Embodiments provided herein may allow for single device (burst errors) error detection and correction, random 1 bit fault (soft error) correction—when there is no burst error while also providing for metadata storage. Embodiments included herein may be based on a modified ECC codec that may be a combination of standard RSECC which is capable of correcting errors at unknown position and Erasure RSECC codec which is capable of correcting errors where position of the error is known. Additional parity checks are added to improve robustness for device fail detection.

Figure 4:
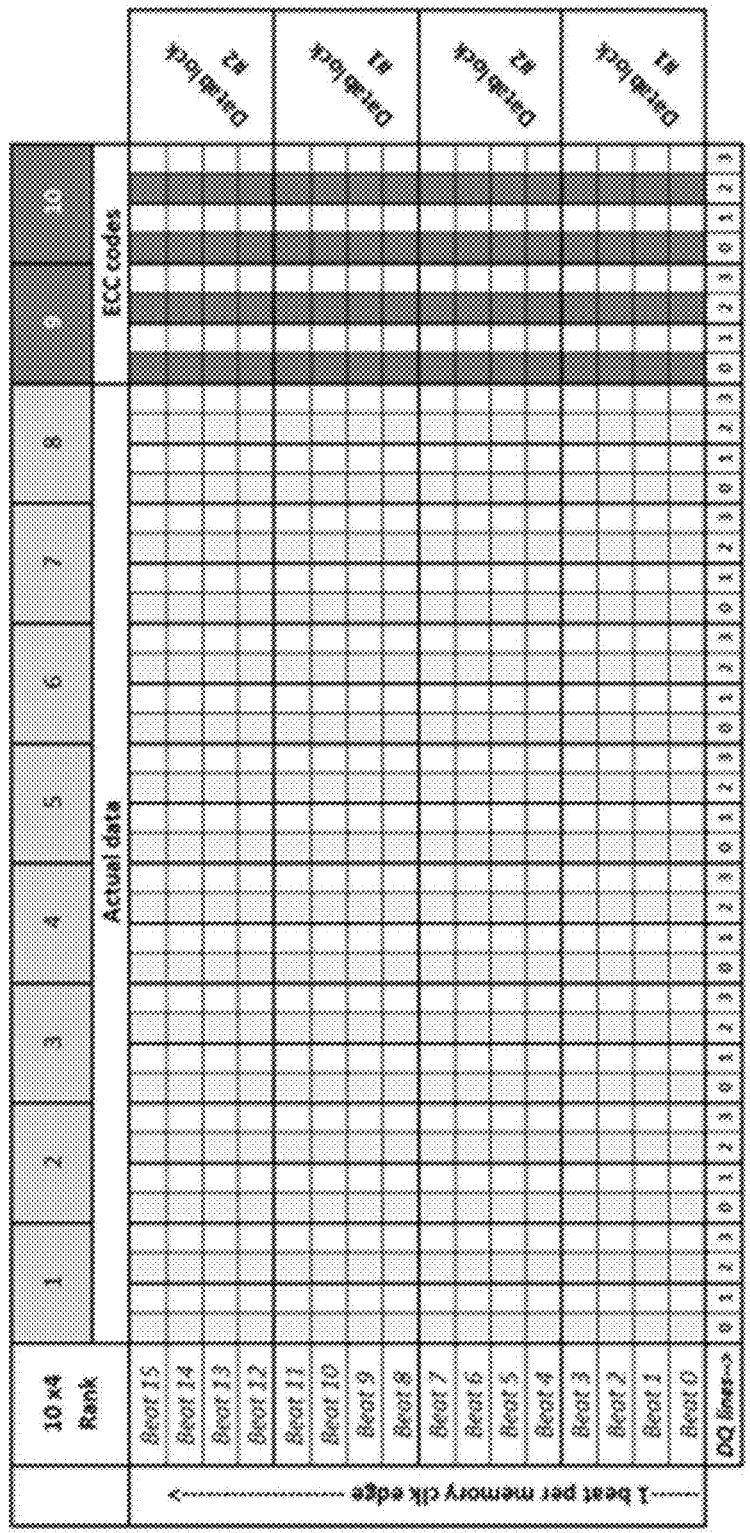
FIG. 4 illustrates a table showing an example for a memory controller targeting a DDR5, dual in-line memory module (DIMM) in a 10×4 configuration consistent with embodiments of the present disclosure.

Referring now to FIGS. 4-11, embodiments consistent with the present disclosure are provided. The example provided below is for a memory controller targeting DDR5 DIMM in a 10×4 configuration. It should be noted that the solution may be applied to other storage components/configurations. In the example of FIG. 4 shows bit blocks access across beats in a burst. In this example, the storage component is a DDR5 DIMM in 10×4 configuration rank (e.g., 10 DRAMs each ×4 style). The memory datapath width is a 32+8=40 bits (32 bits for actual data and 8 bits for side band ECC codes). Each memory clock edge (DDR) has 40 bits of data and ECC codes are accessed. The memory burst length is 16 beats. With a DDR PHY Interface (DFI) ratio of 1:2, the data block size is {128 bits, 32 bits} across 4 beats.

Figure 5:
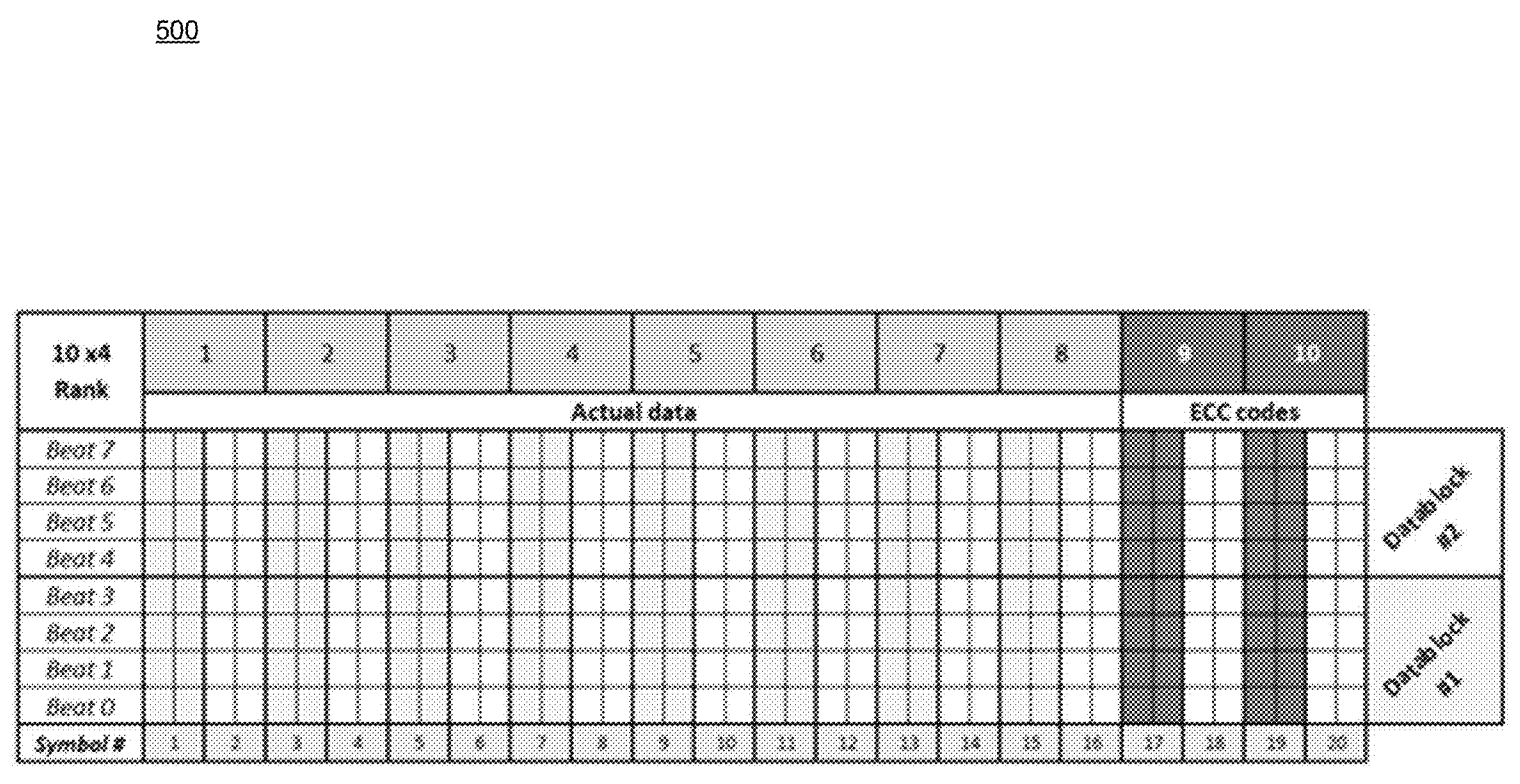

The symbol mapping is 2 bits across 4 beats per symbol per cycle. 16 data symbols and 4 parity symbols. Without metadata storage requirement, we've 32 bit ECC storage for each 128 bit of data block. With Reed Solomon ECC codec RS(20,16,8,2) we should be able to correct two symbols that covers one full DRAM and provide single device correction. FIG. 5 illustrates a table showing symbol mapping per data block across beats consistent with embodiments of the present disclosure.

As you see all the available storage is being used for data and ECC code storage and accommodating additional user information, metadata, is not feasible. if we reduce the error correction capability from two symbol to just one symbol, we'll need only two parity symbols and we'd have the spare storage for metadata. But that's not enough when we target single device correction capability that requires correction of two symbols in this memory configuration.

Embodiments included herein may utilize a dual codec structure and operate on two data-blocks sequentially: error correction with standard RS codec and error and erasure correction erasure RS codec. Error-and-erasure RS codec may use two parity symbols—that is capable of two symbol correction (single device correction) with erasures, and one symbol correction without erasures.

Figure 6:
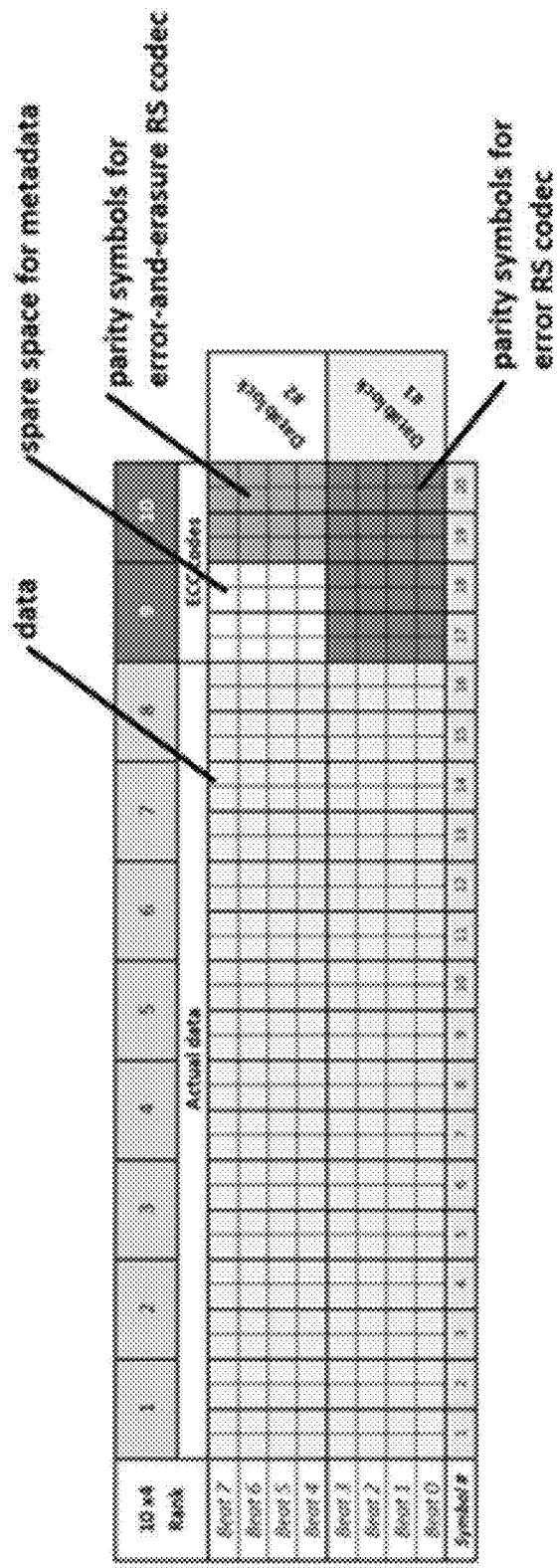
FIG. 6 illustrates a table showing storage space allocation across two data-blocks consistent with embodiments of the present disclosure.

FIG. 6 illustrates a table showing storage space allocation across two data-blocks consistent with embodiments of the present disclosure. In this example, symbols #1-16 are for data storage, symbols #17-20 are in datablock #1 for 4 parity symbol storage, standard RS codec, symbols #19-20 are in datablock #2 for 2 parity symbol storage, error-and-erasure RS codec, and symbols #17-18 in datablock #2 are spare, which is 16 bits of metadata for 256 bits of actual data across two data-blocks. Out of 16 spare bits, 8 bits may be used for metadata storage and 8 bits may be used for parity storage.

In this example, data-block #1 may correspond to a chunk of data from 4 beats of the memory burst (BL16: beats 0-1-2-3, 8-9-10-11). Here, a standard RS(20,16,8,2) codec may be used. The system may detect and correct random faults or burst errors (e.g., up to two symbol errors (Device correct)) and may identify if this is a burst error confined to single device—latch the erroneous symbol positions. Data-block #2 may correspond to a chunk of data from the next 4 beats of the memory burst (BL16: beats 4-5-6-7, 12-13-14-15). Here, an erasure RS(20,18,8,2) codec may be used to correct an erroneous symbol whose position is known from previous cycle=>corresponding to single device. Erasure RS(20,18,8,1) codec may be used to correct an erroneous symbol for random fault when error position is not available from the previous cycle. For the error cases where error-erasure decoder fails to detect the error (e.g., no erasures or erasure from data-block #1 doesn't match the failures in data-block #2), there may be silent corruption. Detection of error in data-block #2 is very critical, and this is achieved with parity gen-check using spare bits available in data-block #2. Examples of these device errors are provided below in FIGS. 7-9.

Figure 7:
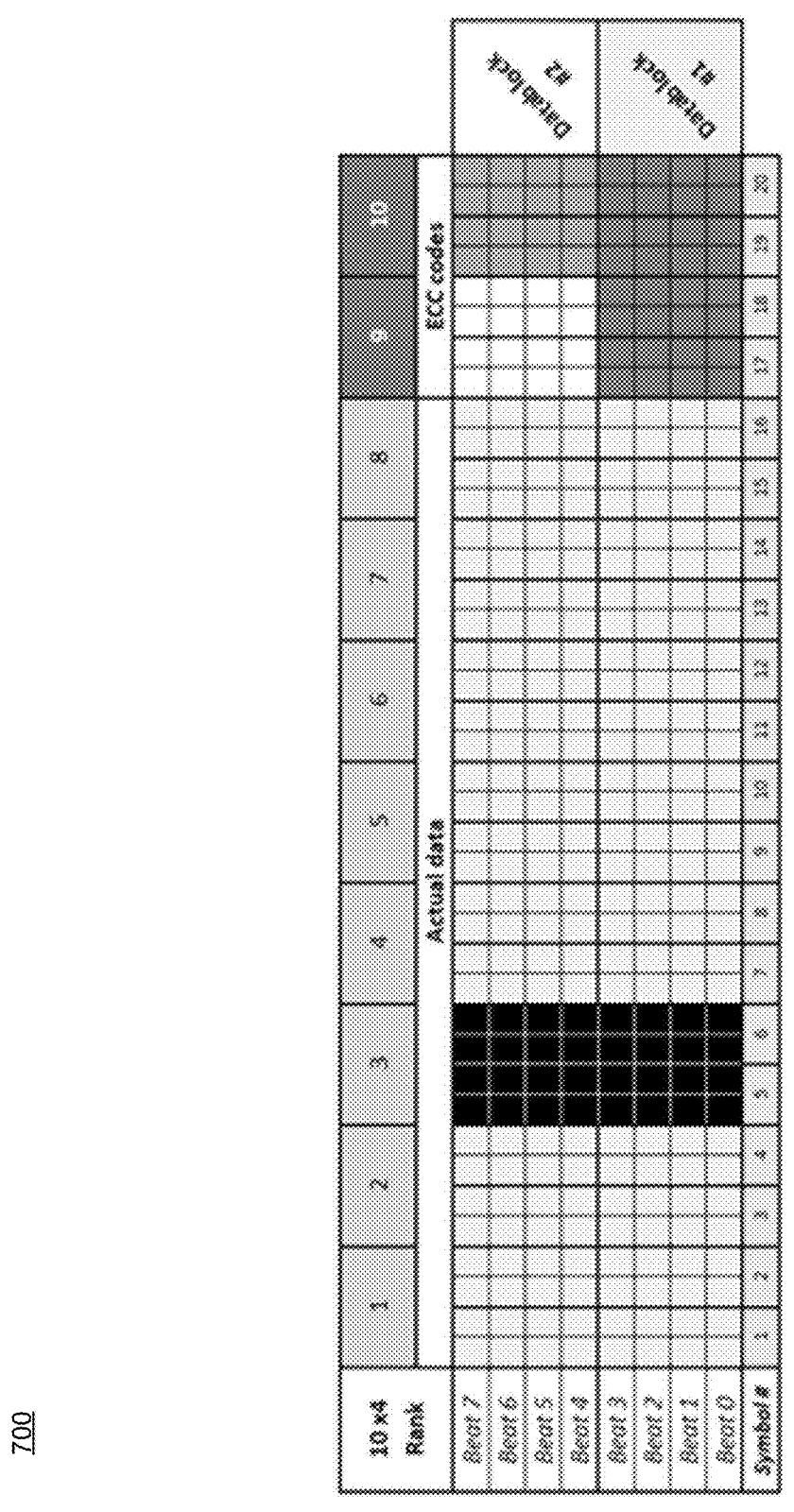

FIG. 7 illustrates a table showing a burst error/device failure example consistent with embodiments of the present disclosure. In this example, assume device-3 has a burst error on all 4 DQ lines and that is correctable with RS(20, 16,8,2) in data-block #1. In the next data-block we already know that symbol #5 and #6 was erroneous so those two symbols may be corrected with the erasure codec with just two parity symbols.

Figure 8:
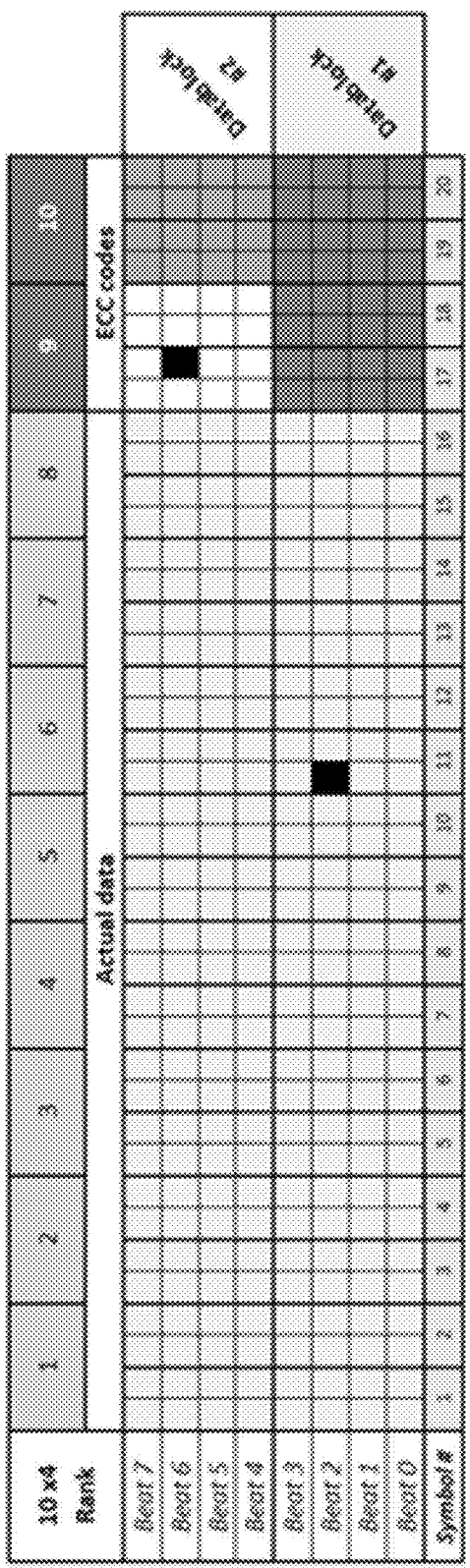
Figure 9:
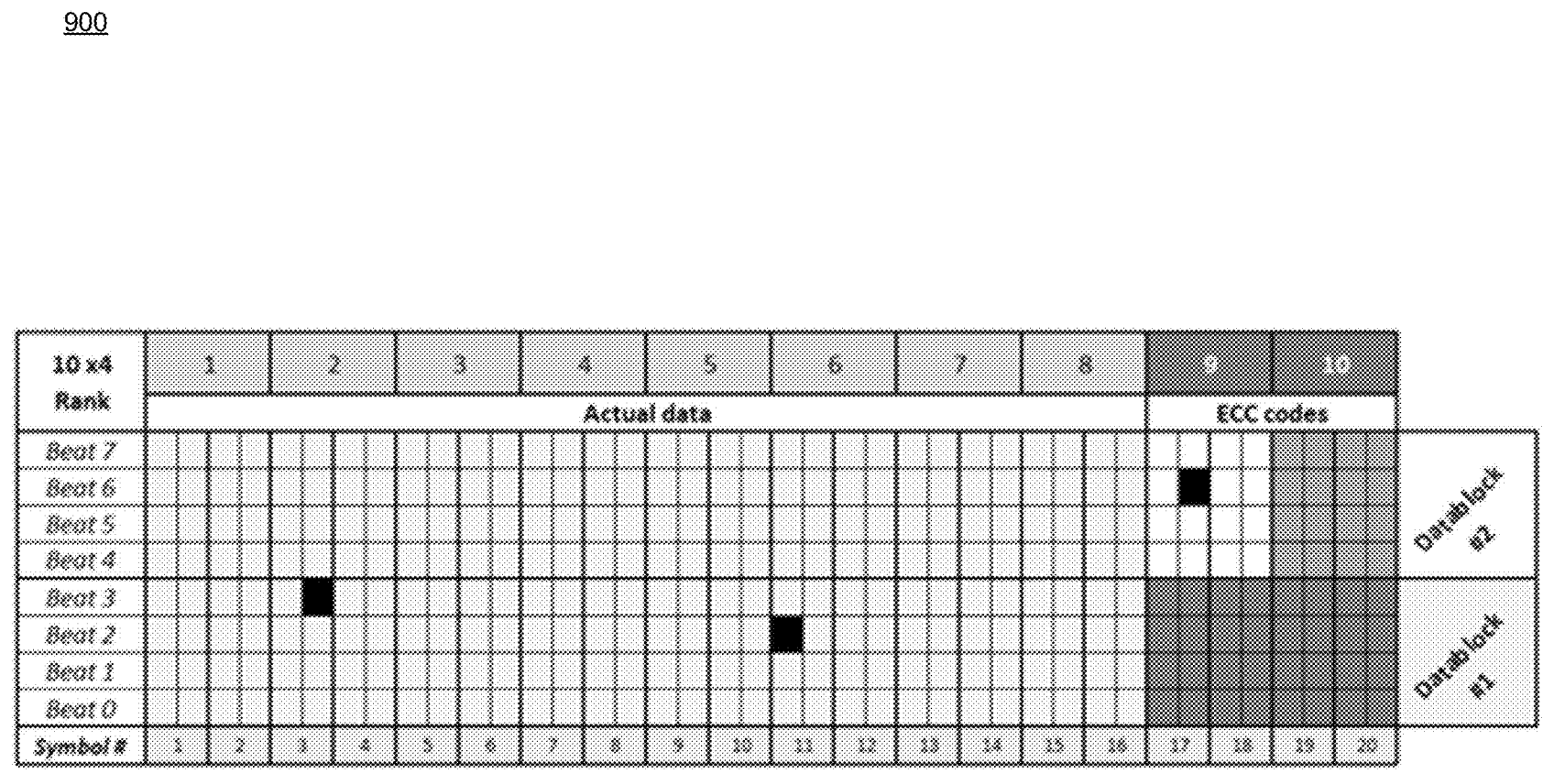

FIGS. 8-9 illustrates tables showing 1-bit soft error/random fault examples consistent with embodiments of the present disclosure. In this example, in data-block #1 there is a two symbol correction capability so the system is able to correct two random faults anywhere in whole 128*b* data and 32*b* parity—random faults in device-2 and device-6. Whereas in data-block #2, there is only one symbol correction capability (e.g., random fault in device-9).

Figure 10:
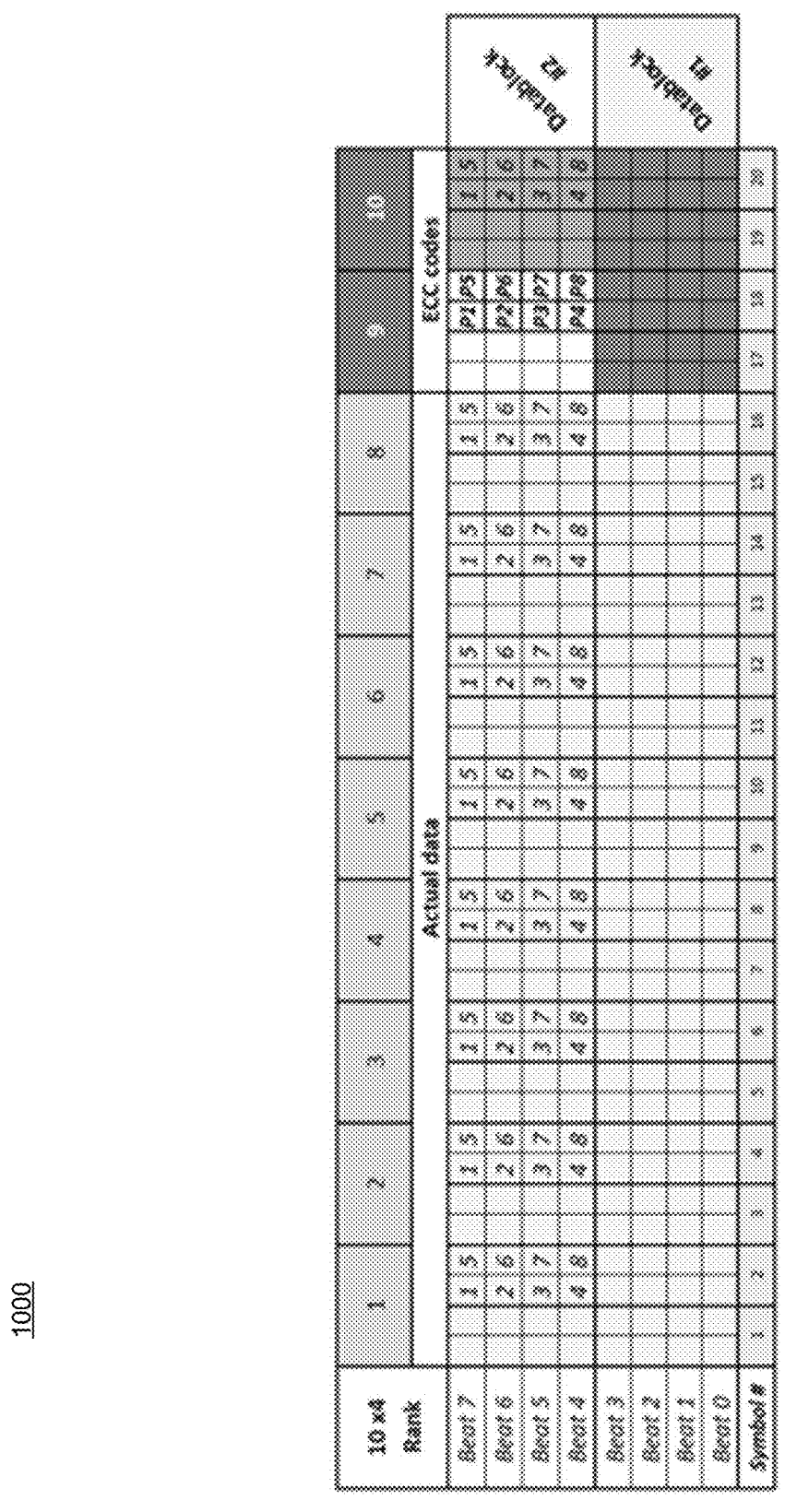

FIG. 10 illustrates a table showing error detection in data block #2 with parity consistent with embodiments of the present disclosure. In some cases, parity checks may improve error detection capability to 100% and may be relevant to data-block #2. Parity based detection uses impacted bits in half the device only. For example, if only half is erroneous and not the one that is considered for parity generation/checking it would be detected/corrected by the RS codec as it would contribute errors to only one symbol.

P1=XOR(all bits marked with '1' in each device)
P2=XOR(all bits marked with '2' in each device)
P3=XOR(all bits marked with '3' in each device)
P4=XOR(all bits marked with '4' in each device)
P5=XOR(all bits marked with '5' in each device)
P6=XOR(all bits marked with '6' in each device)
P7=XOR(all bits marked with '7' in each device)
P8=XOR(all bits marked with '8' in each device)

As there is only 1 bit taken for Pn the parity check is always successful in detection of single device failure in data-block #2. This gives us 100% single device failure detection capability.

Examples for device error correction and detection capability calculations are provided in further detail below. In data-block #1 we have 100% device error detection and correction capability as there is enough storage space for ECC as no metadata is stored in data-block #1.

In data block #2, with a parity generation/checking scheme there is 100% single device failure detection capability. For example, if no erasures are available from data-block #1 and there is burst error in data-block #2 that spreads on all 4 DQ lines—full (e.g., both symbols) single device failure. In this case, the error-and-erasure RS codec cannot successfully detect/correct the error. The system may then calculate the percentage impact of such scenario on claiming the SDDC capability.

Assuming equal probability of occurrence of error on any combination of bits within a ×4 DRAM. This example operates on two data-blocks that is 32 bits per single device. Where there is a total of 232=4,294,967,296 combinations out of which 1 is correct data that means there are 4,294,967,295 error combinations. Out of these there are only two uncorrectable symbols in data-block #2 that is 28=256 combinations per symbol where 1 combination is correct data that gives 255*255=65,025 erroneous combinations that are uncorrectable. This is 99.998% single device failure correction capability (4,294,967,296−65,025=4,294,902,271).

Figure 11:
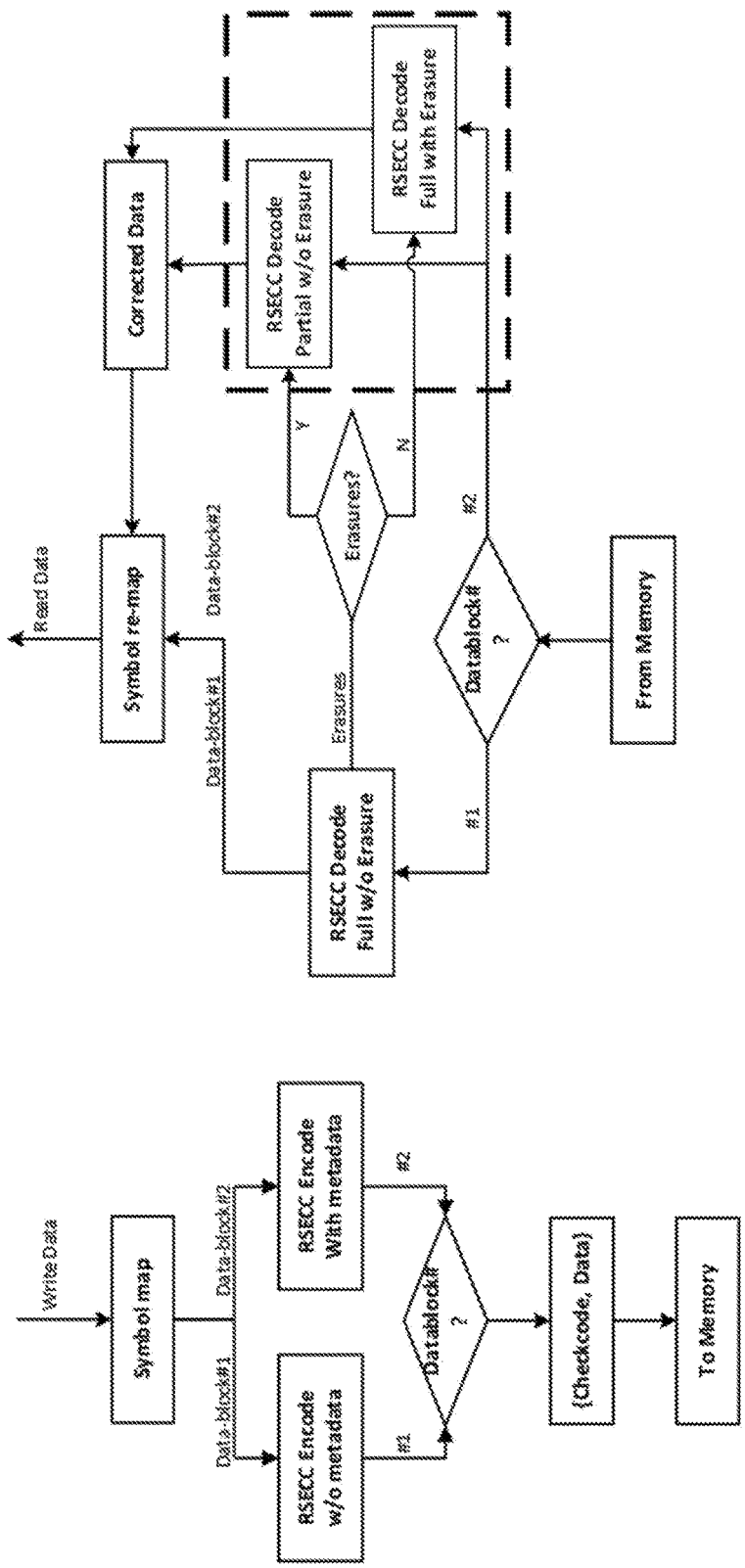
FIG. 11 illustrates a flowchart consistent with embodiments of the present disclosure.

FIG. 11 illustrates a flowchart consistent with embodiments of the present disclosure. Separate flows are provided for both write and read data respectively.

Figure 12:
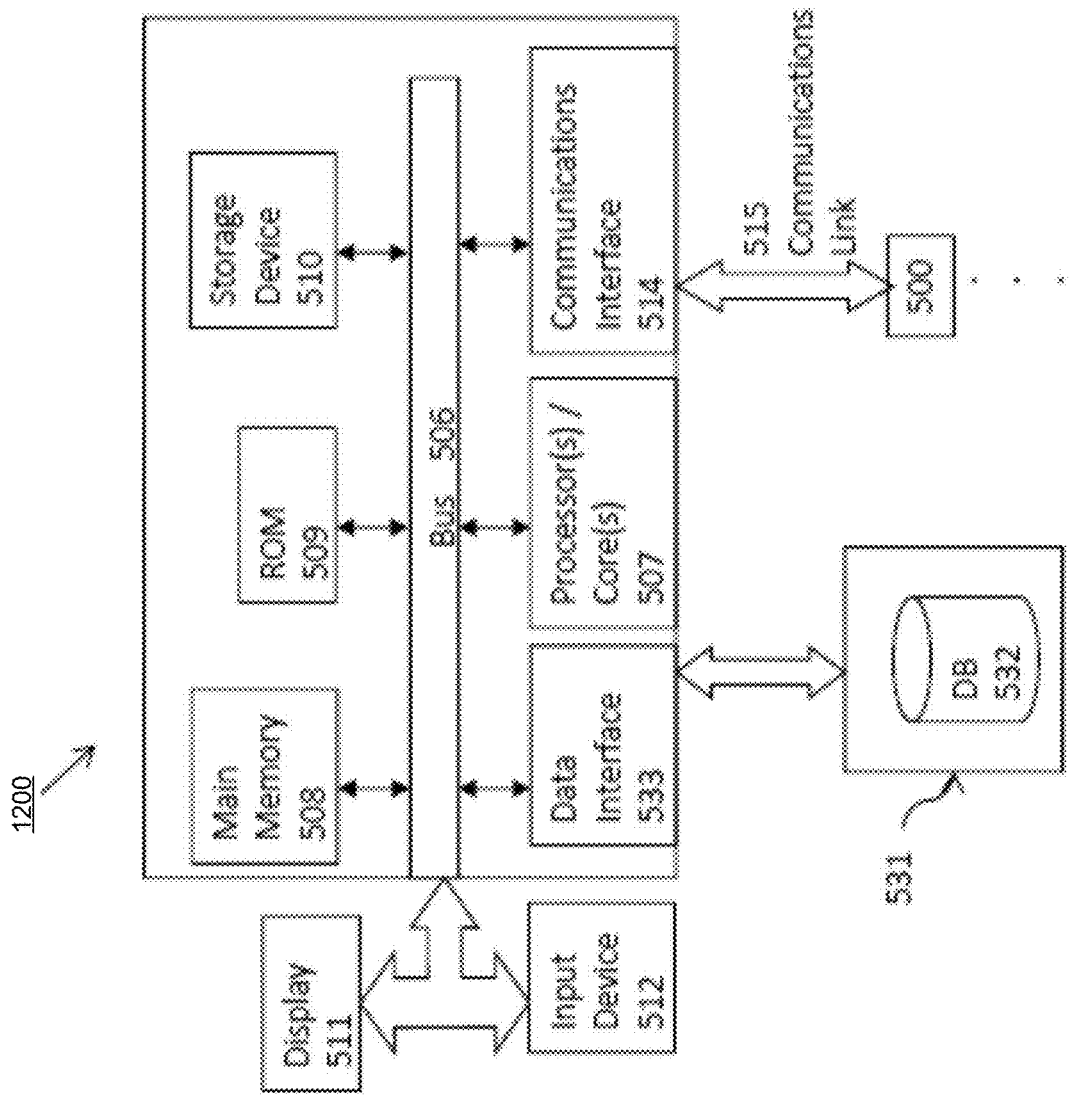
FIG. 12 illustrates a system diagram that may be used to implement one or more embodiments.

FIG. 12 illustrates a block diagram of an illustrative computing system 1200 suitable for poison information propagation as described in the preceding paragraphs with reference to various figures. Computer system 1200 includes a bus 506 or other communication mechanism for communicating information, which interconnects subsystems and devices, such as processor 507, system memory 508 (e.g., RAM), static storage device 509 (e.g., ROM), disk drive 510 (e.g., magnetic or optical), communication interface 514 (e.g., modem or Ethernet card), display 511 (e.g., CRT or LCD), input device 512 (e.g., keyboard), and cursor control (not shown).

According to one embodiment, computing system 1200 performs specific operations by one or more processor or processor cores 507 executing one or more sequences of one or more instructions contained in system memory 508. Such instructions may be read into system memory 508 from another computer readable/usable storage medium, such as static storage device 509 or disk drive 510. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 507, where the one or more processors, one or more processor cores, or combination thereof executes one or more threads. For example, various acts of identifying, various acts of determining, various acts of classifying, various acts of implementing, various acts of performing, various acts of transforming, various acts of decomposing, various acts of updating, various acts of presenting, various acts of modifying, etc. may be performed by one or more processors, one or more processor cores, or combination thereof.

A mechanism described herein may also be implemented as a pure hardware module (e.g., a block of electronic circuit components, electrical circuitry, etc.) or a combination of a hardware module and a software block that jointly perform various tasks to achieve various functions or purposes described herein or equivalents thereof. For example, a mechanism described herein may be implemented as an application-specific integrated circuit (ASIC) in some embodiments.

In these embodiments, a mechanism may thus include, for example, a microprocessor or a processor core and other supportive electrical circuitry to perform specific functions which may be coded as software or hard coded as a part of an application-specific integrated circuit, ROM (read only memory), PROM (programmable read only memory), EPROM (erasable programmable read only memory), etc. despite the fact that these microprocessor, processor core, and electrical circuitry may nevertheless be shared among a plurality of mechanism. A mechanism described herein or an equivalent thereof may perform its respective functions alone or in conjunction with one or more other mechanisms. A mechanism described herein or an equivalent thereof may thus invoke one or more other mechanisms by, for example, issuing one or more commands or function calls. The invocation of one or more other mechanisms may be fully automated or may involve one or more user inputs.

The term "computer readable storage medium" or "computer usable storage medium" as used herein refers to any non-transitory medium that participates in providing instructions to processor 507 for execution. Such a medium may take many forms, including but not limited to, non-volatile media and volatile media. Non-volatile media includes, for example, optical or magnetic disks, such as disk drive 510. Volatile media includes dynamic memory, such as system memory 508. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the present disclosure, execution of the sequences of instructions to practice the invention is performed by a single computer system 1200. According to other embodiments of the invention, two or more computer systems 1200 coupled by communication link 515 (e.g., LAN, PTSN, or wireless network) may perform the sequence of instructions required to practice the invention in coordination with one another.

Computer system 1200 may transmit and receive messages, data, and instructions, including program, e.g., application code, through communication link 515 and communication interface 514. Received program code may be executed by processor 507 as it is received, and/or stored in disk drive 510, or other non-volatile storage for later execution. In an embodiment, the computing system 1200 operates in conjunction with a data storage system 531, e.g., a data storage system 531 that includes a database 532 that is readily accessible by the computing system 1200. The computing system 1200 communicates with the data storage system 531 through a data interface 533. A data interface 533, which is coupled with the bus 506, transmits and receives electrical, electromagnetic or optical signals that include data streams representing various types of signal information, e.g., instructions, messages and data. In embodiments of the invention, the functions of the data interface 533 may be performed by the communication interface 514. It also should be appreciated that the computer system 1200 may be extended to a cloud-based computing system.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A method comprising:
   receiving one or more fixed size error checking and correction data blocks and metadata at a memory controller;
   performing data to symbol mapping based upon, at least in part, the one or more fixed size data blocks;
   providing an output of the data to symbol mapping to a first encoder without metadata configured for full detection correction of single device error and to a second encoder with metadata configured for partial detection correction of single device error;
   receiving data at a memory based upon, at least in part, an output from the first encoder and the second encoder;
   receiving data from the memory at a first decoder without metadata configured for full detection correction of single device error and at a second decoder with metadata configured for partial detection correction;
   re-mapping symbol data from the first decoder and the second decoder to actual data; and
   generating one or more output data blocks and metadata.

2. The method of claim 1, wherein at least one of the first decoder and the second decoder is an erasure decoder.

3. The method of claim 1, wherein the output of the data to symbol mapping is first provided to a parity generator.

4. The method of claim 1, wherein receiving data from the memory is first provided to a parity checker.

5. The method of claim 1, wherein the memory controller is a double data rate (DDR) memory controller.

6. The method of claim 1, wherein the first encoder and second encoder are Reed-Solomon error checking and correcting (RSECC) encoders.

7. The method claim 1, wherein the output of the data to symbol mapping is provided to a data block that provides toggle control for consecutive data blocks.

8. A method comprising:
   receiving a plurality of fixed size error checking and correction data blocks and metadata at a DDR memory controller;
   performing data to symbol mapping based upon, at least in part, the plurality of fixed size data blocks;
   providing an output of the data to symbol mapping to a first RSECC encoder without metadata configured for full detection correction of single device error and to a second RSECC encoder with metadata configured for partial detection correction of single device error;
   receiving data at a memory based upon, at least in part, an output from the first RSECC encoder and the second RSECC encoder;
   receiving data from the memory at a first RSECC decoder without metadata configured for full detection correction of single device error and at a second RSECC decoder with metadata configured for partial detection correction;
   re-mapping symbol data from the first RSECC decoder and the second RSECC decoder to actual data; and
   generating a plurality of output data blocks and metadata.

9. The method of claim 8, wherein at least one of the first RSECC decoder and the second RSECC decoder is an erasure decoder.

10. The method of claim 8, wherein the output of the data to symbol mapping is first provided to a parity generator.

11. The method of claim 8, wherein receiving data from the memory is first provided to a parity checker.

12. The method claim 8, wherein the output of the data to symbol mapping is provided to a data block that provides toggle control for consecutive data blocks.

13. The method of claim 10, wherein the parity generator is configured to generate parity calculations across all connected devices for one or more selected bits.

14. The method claim 8, wherein receiving data at the memory includes receiving metadata at the memory.

15. A system comprising:
   a memory controller configured to receive one or more fixed size error checking and correction data blocks and metadata, the memory controller including a data to symbol mapping portion further configured to perform data to symbol mapping based upon, at least in part, the one or more fixed size data blocks, the data to symbol mapping portion further configured to provide an output of the data to symbol mapping to a first encoder without metadata configured for full detection correction of single device error and to a second encoder with metadata configured for partial detection correction of single device error;
   a memory configured to receive data based upon, at least in part, an output from the first encoder and the second encoder;
   a first decoder without metadata configured to receive data from the memory, wherein the first decoder without metadata is configured for full detection correction of single device error;
   a second decoder with metadata configured to receive data from the memory, wherein the second decoder is configured for partial detection correction; and
   a symbol re-mapping portion configured to re-map symbol data from the first decoder and the second decoder to actual data and to generate one or more output data blocks and metadata.

16. The system of claim 15, wherein at least one of the first decoder and the second decoder is an erasure decoder.

17. The system of claim 15, wherein the output of the data to symbol mapping is first provided to a parity generator.

18. The system of claim 15, wherein receiving data from the memory is first provided to a parity checker.

19. The system of claim 15, wherein the memory controller is a DDR memory controller.

20. The system of claim 15, wherein the output of the data to symbol mapping is provided to a data block that provides toggle control for consecutive data blocks.

* * * * *